(12) United States Patent
Cauceglia et al.

(10) Patent No.: US 11,137,373 B2
(45) Date of Patent: Oct. 5, 2021

(54) QCM MEASUREMENT OF SCALE FORMATION

(71) Applicant: HF Scientific, LLC, Fort Myers, FL (US)

(72) Inventors: Dorian Cauceglia, Cape Coral, FL (US); Thomas R. Whiteside, North Fort Myers, FL (US); Pamela Eldridge, Fort Myers, FL (US); Nicholas J. Pusateri, Cape Coral, FL (US)

(73) Assignee: HF Scientific, Inc., Cape Coral, FL (US)

( * ) Notice: Subject to any disclaimer, the term of this patent is extended or adjusted under 35 U.S.C. 154(b) by 139 days.

(21) Appl. No.: 16/418,007

(22) Filed: May 21, 2019

(65) Prior Publication Data

US 2019/0360967 A1 Nov. 28, 2019

Related U.S. Application Data

(60) Provisional application No. 62/675,898, filed on May 24, 2018.

(51) Int. Cl.
*G01N 29/036* (2006.01)
*G01N 29/44* (2006.01)
(Continued)

(52) U.S. Cl.
CPC ......... *G01N 29/022* (2013.01); *G01N 29/036* (2013.01); *G01N 29/4409* (2013.01);
(Continued)

(58) Field of Classification Search
CPC ............ G01N 29/036; G01N 29/4409; G01N 29/022; G01N 29/222; G01N 2291/0258;
(Continued)

(56) References Cited

U.S. PATENT DOCUMENTS

| 5,734,098 A * | 3/1998 | Kraus ................. G01N 17/008 73/61.62 |
| 2011/0104900 A1 * | 5/2011 | Hinsberg .......... H01L 21/28123 438/694 |

(Continued)

FOREIGN PATENT DOCUMENTS

CN 104833849 A * 4/2015

OTHER PUBLICATIONS

Biosensors and Bioelectronics, vol. 16, Issues 9-12, Dec. 2001, pp. 735-743, Ultrasensitive quartz crystal microbalance sensors for detection of M13-Phages in liquids, Uttenthaler et al. (Year: 2001).*

(Continued)

*Primary Examiner* — Jacques M Saint Surin
(74) *Attorney, Agent, or Firm* — Harris Beach PLLC (57) ABSTRACT

A water hardness mitigation or treatment evaluation system includes a first quartz crystal microbalance cell and a fluid coupling adapted to be fluidly coupled to a pre-treated water to be flowed over a first quartz crystal. A second quartz crystal microbalance cell and a fluid coupling are adapted to be fluidly coupled to a post-treated water to be flowed over a second quartz crystal. A computer processor receives a first frequency data from the first quartz crystal and a second frequency data from the second quartz crystal and based on a difference of frequency over time between the first frequency data and the second frequency data, provides an indication of an effectiveness of a water hardness mitigation (Continued)

or treatment component or system. A method to evaluate and effectiveness of a water hardness mitigation or treatment evaluation system is also described.

10 Claims, 8 Drawing Sheets

(51) Int. Cl.
  *G01N 29/02* (2006.01)
  *C02F 1/52* (2006.01)
  *C02F 5/02* (2006.01)
(52) U.S. Cl.
  CPC ...... *C02F 1/52* (2013.01); *C02F 5/02* (2013.01); *C02F 2001/5218* (2013.01); *G01N 2291/0228* (2013.01)
(58) Field of Classification Search
  CPC .... G01N 2291/0256; G01N 2291/0228; C02F 2209/40; C02F 1/52; C02F 5/02; C02F 2001/5218
  USPC ........................................................ 73/61.79
  See application file for complete search history.

(56) References Cited

U.S. PATENT DOCUMENTS

| | | | |
|---|---|---|---|
| 2012/0194280 A1* | 8/2012 | Akaike | H03L 1/026 331/48 |
| 2012/0211419 A1 | 8/2012 | Koslow | |
| 2012/0218048 A1* | 8/2012 | Akaike | H03L 1/00 331/2 |
| 2014/0238114 A1* | 8/2014 | Klasner | E21B 43/26 73/61.75 |
| 2015/0377877 A1* | 12/2015 | Dom Nguez Canas | G01N 33/54386 435/7.93 |
| 2018/0143850 A1* | 5/2018 | Avni | G06F 11/1474 |

OTHER PUBLICATIONS

Quartz crystal microbalance setup for frequency and G!?-factor measurements in gaseous and liquid environments, Rodahl et al. Department of Applied Physics, pp. 3924-3930. (Year: 1995).*

* cited by examiner

QCM MEASUREMENT OF SCALE FORMATION

CROSS-REFERENCE TO RELATED APPLICATIONS

This application claims priority to and the benefit of U.S. provisional patent application Ser. No. 62/675,898, QCM MEASUREMENT OF SCALE FORMATION, filed May 24, 2018, which application is incorporated herein by reference in its entirety.

FIELD OF THE APPLICATION

The application relates to water quality testing, and particularly to a water quality testing apparatus to measure an effectiveness of a hard water treatment or mitigation device or system.

BACKGROUND

Hardness materials, usually minerals, such as calcium carbonate, in water can lead to harmful mineral deposit build ups in pipes, fixtures, and appliances. Various technologies exist to mitigate water hardness. One of the newer technologies which reduces mineral build up through a catalyst action is the OneFlow® anti-scale system available from Watts Water Technologies, Inc. of North Andover, Mass.

SUMMARY

According to one aspect, a water hardness mitigation or treatment evaluation system includes a first quartz crystal microbalance cell having a first quartz crystal and a fluid coupling adapted to be fluidly coupled to a pre-treated water to be flowed over the first quartz crystal. A second quartz crystal microbalance cell has a second quartz crystal and a fluid coupling adapted to be fluidly coupled to a post-treated water to be flowed over the second quartz crystal. A computer processor is communicatively coupled to one or more frequency counters to receive a first frequency data from the first quartz crystal and a second frequency data from the second quartz crystal and based on a difference of frequency over time between the first frequency data and the second frequency data caused by a first scale build-up on the first quartz crystal and a second scale build up on the second quartz crystal, the computer processor provides an indication of an effectiveness of a water hardness mitigation or treatment component or system.

In one embodiment, each flow cell further includes a series connected pump and a pump controller fluidly coupled to each of the first quartz crystal microbalance cell and the second quartz crystal microbalance cell respectively to set a substantially constant flow rate through the first quartz crystal microbalance cell and the second quartz crystal microbalance cell.

In another embodiment, each of the first quartz crystal and the second quartz crystal include a natural frequency of about 10 MHz.

In yet another embodiment, the indication of an effectiveness of a water hardness mitigation or treatment component or system includes a display graph of the first frequency data and the second frequency data, or a difference thereof.

In yet another embodiment, the water hardness mitigation or treatment evaluation system further includes one or more valves, the computer processor communicatively coupled to the one or more valves, and the indication of an effectiveness of a water hardness mitigation or treatment component or system includes an actuation of the one or more valves to automatically select which water hardness mitigation or treatment component of the water hardness mitigation or treatment evaluation system is to receive a water to be treated.

According to another aspect, a method to evaluate and effectiveness of a water hardness mitigation or treatment evaluation system includes: providing a first quartz crystal microbalance cell having a first quartz crystal over which a pretreated water is flowed, a second quartz crystal microbalance cell having a second quartz crystal over which a post-treated water is flowed, and a computer processor communicatively coupled to one or more frequency counters to receive a first frequency data from the first quartz crystal and a second frequency data from the second quartz crystal; calculating a frequency difference between the first quartz crystal and the second quartz crystal; recording the frequency difference over a period of time; and providing an indication of an effectiveness of a water hardness mitigation or treatment component or system.

In one embodiment, the step of providing further includes providing a pump fluidly coupled to and in series with each of the first quartz crystal microbalance cell and the second quartz crystal microbalance cell respectively to provide a substantially constant flow of liquid through the first quartz crystal microbalance cell and the second quartz crystal microbalance cell.

In another embodiment, the step of providing an indication includes displaying one or more graphs of frequency of either of the first quartz crystal and the second quartz crystal or a difference thereof.

In yet another embodiment, the step of providing an indication includes providing an indication to an operator indicating that one or more components of the water hardness mitigation or treatment component or system need to be serviced or changed.

In yet another embodiment, the step of providing an indication includes controlling one or more valves to automatically select by computer which of one or more treatment or mitigation components is to receive a flow of water to be treated.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

DETAILED DESCRIPTION

Hardness materials, usually minerals, such as calcium carbonate, in water (e.g. hard water) can lead to harmful mineral deposit build ups in pipes, fixtures, and appliances. After many years of operation with hard water, scale build-up of various degree occurs depending on such factors as the hardness of the water, the water flow, and the compositions of the minerals which cause the scale. In many cases, such deposits can be seen by visual observation alone.

In a manufacturing laboratory setting, detection and measurement of scale build-up can be more difficult. Testing new water treatment technologies over times ranging from hours and days to weeks can be important in development and design cycles. However, visual detection is not a viable option in an R&D setting because typically, there is not enough time for significant scale build-up. What is needed is a new laboratory technique to quantitatively measure the effectiveness of scale reduction and scale mitigation equipment over relatively short lapsed times of hours and days.

During development of the WATTS OneFlow® anti-scale product, it was realized that a scale build-up measurement device could be based on short-term microscopic scale build-up on a quartz crystal. In a new use for a quartz crystal microbalance, a water quality instrument was realized. The new water quality instrument can measure short term scale formation to study the effectiveness of water hardness mitigation techniques in the laboratory over relatively short periods of time.

As the water quality instrument was developed, it was also realized that such water analysis of scale build-up can also be incorporated into operational water treatment and/or water hardness mitigation systems in the field. Moreover, near real-time measurement of short-term scale build-up can be used to control treatment and/or mitigation systems such as by controlling which devices are online (i.e. which treatment or mitigation devises are inserted into an active water supply line). For example, the number of treatment or mitigation devices online (i.e. in the active flow of water being used) can be automatically controlled by computer-controlled valves. Or, where increasing scale build-up is measured due do end of life a treatment or mitigation component, another component can be automatically switched in to the active water flow to take its place, typically by setting the positions of computer-controlled flow valves in a building or home operational water system.

In one embodiment, a differential measurement is based on two different quartz crystal microbalance (QCM) sensors. A first QCM flow cell can monitor scale formation in a water input line (e.g. from a source of municipal water) to a scale treatment or mitigation component device. A second QCM flow cell can monitor scale formation in a water output or water supply line coming from the scale treatment or mitigation component device, post treatment or mitigation. One advantage of such a differential measurement is that systematic QCM sensor errors, such as sensor value changes due to room temperature, water temperature, or other error causing influences can be substantially eliminated by reading of both of the first and second QCM sensors at about the same time and at about the same ambient and water flow conditions.

Figure 1:
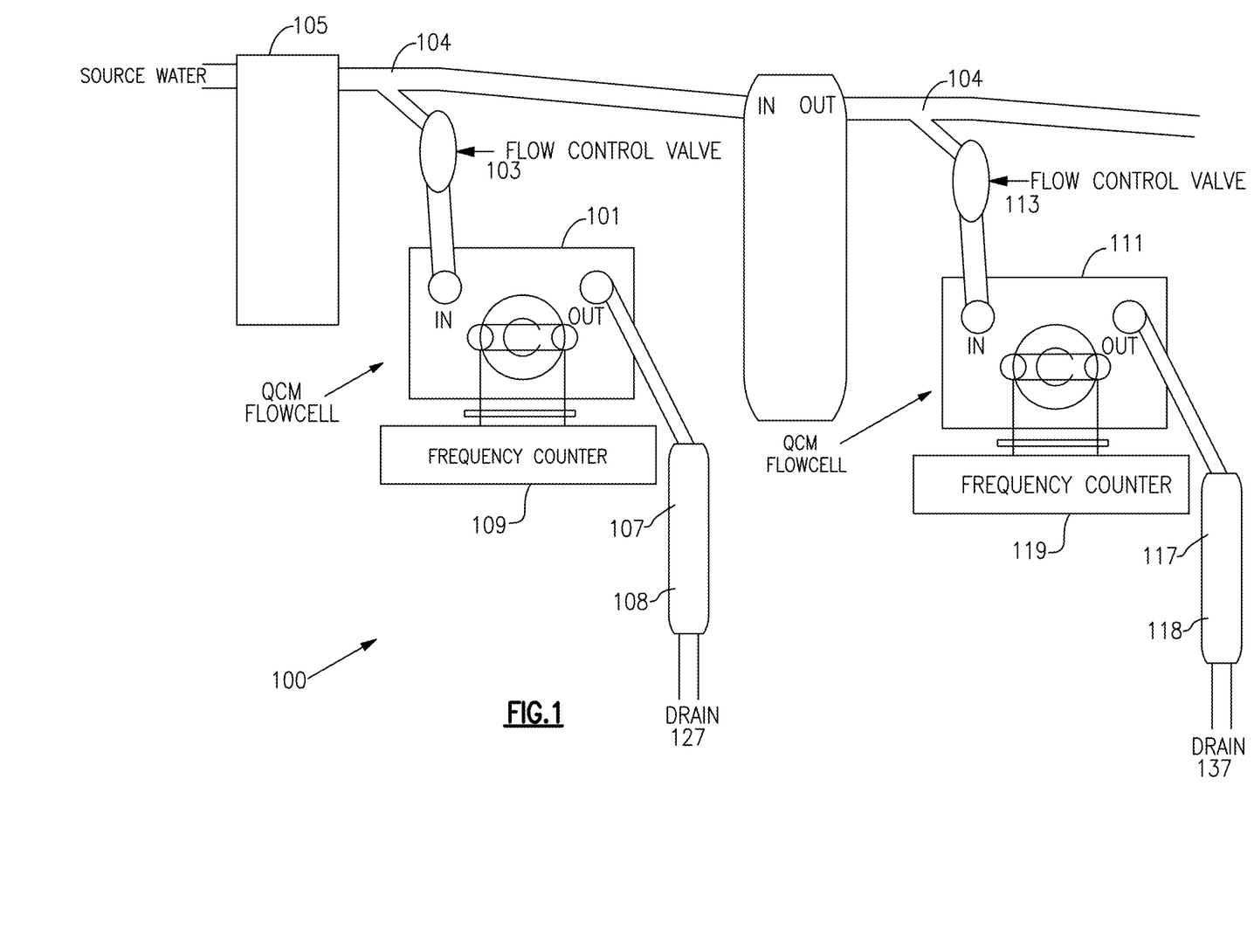
FIG. 1 shows a schematic diagram of an exemplary differential QCM cell scale measurement water quality analysis instrument.

FIG. 1 shows a schematic diagram of an exemplary differential QCM cell scale measurement water quality analysis instrument 100. In the exemplary embodiment of FIG. 1, a source water (e.g. from a municipal water supply line in a building) is fluidly coupled into the instrument via one or more pressure regulators and/or flow restrictions 105. A first tap 104 provides a flow of sample water to the first QCM flow cell 101 via a flow control valve 103. Once passed through the QCM flow cell 101 and over the surface of the quartz crystal there within, the sample water is discharged to a drain 127. There can be a pump 107 and pump controller 108 in the water sample flow discharge path to further control and regulate the water flow through the QCM flow cell 101. In the exemplary embodiment of FIG. 1, this first QCM flow cell 101 monitors scale formation in water supply line which provides a source of water to a treatment or mitigation device to reduce scale formation, here an exemplary OneFlow® anti-scale system. Following in the output water line, post treatment, is a second QCM flow cell 111 in an arrangement similar to the first QCM flow cell 101. A second tap 114 provides a flow of sample water to the first QCM flow cell 111 via a flow control valve 113. Once passed through the QCM flow cell 111 and over the surface of the quartz crystal there within, the sample water is discharged to a drain 118 (typically drain 127 and drain 137 can merge to a common drain (not shown in FIG. 1). Also, a similar pump 117 and pump controller 118 in the water sample flow discharge path can further control and regulate the water flow through the QCM flow cell 111.

The sample flow of pre-treatment water to the first QCM flow cell 101 will over time cause a first rate of scale buildup on the quartz crystal of the first QCM flow cell 101, as the sample flow of post-treatment water to the second QCM flow cell 111 over time causes a second rate of scale buildup on the quartz crystal of the second QCM flow cell 111. Each QCM flow cell is coupled to an electronics board which causes each of the quartz crystals of QCM flow cell 101 and QCM flow cell 111 to vibrate at a natural frequency of the quartz crystals as modified by a current level of scale build up. The frequency of each of the quartz crystals is measured, typically by an electronic frequency counter. Such counter technologies are well known to those skilled in the art, and quartz crystal vibration frequency measurements to better than six digits of resolution are also common. By measuring the frequency of each of the crystals over time, the total scale build-up on each crystal as well as a rate of scale formation can be measured. The difference, such as, for example, the difference between the total scale formation and/or the two rates of scale formation can be used to quantitatively determine an effectiveness of a scale treatment and/or scale mitigation system.

Figure 2:
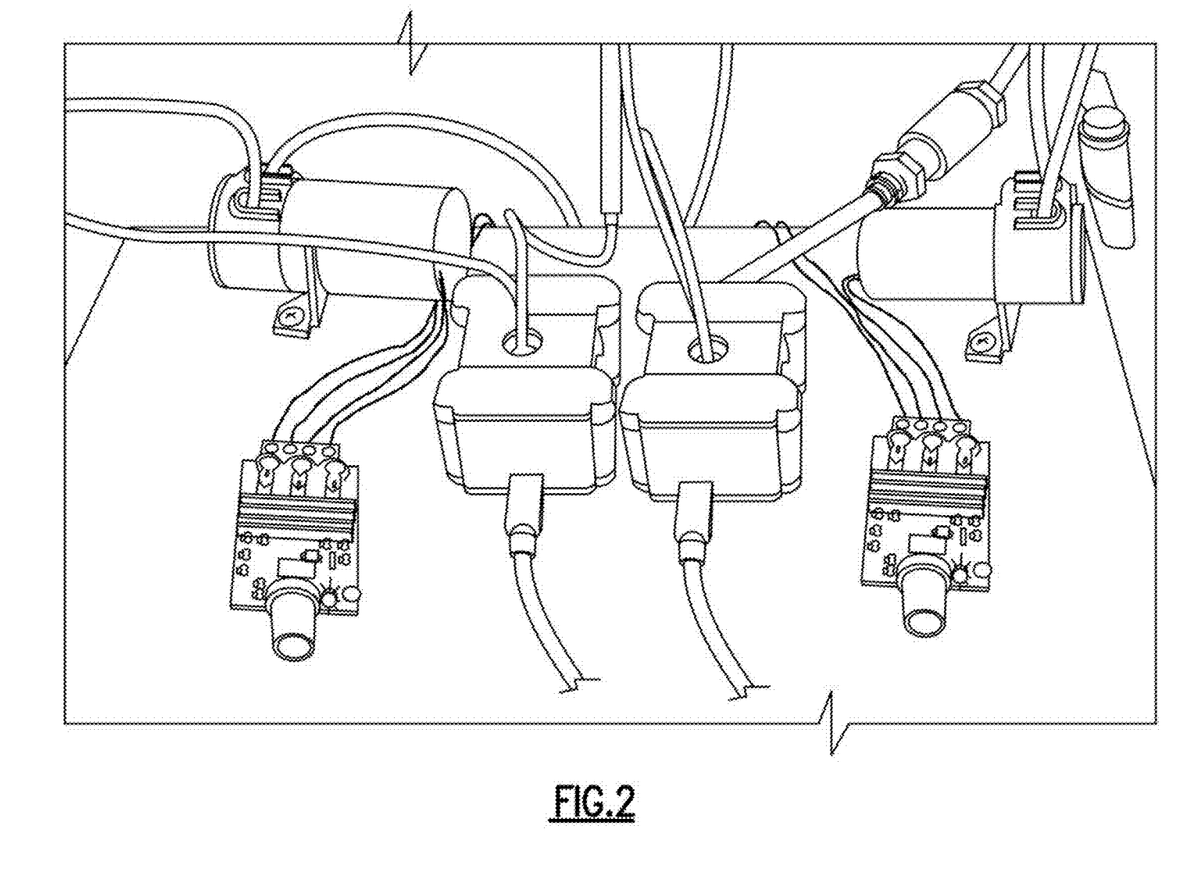
FIG. 2 shows a drawing of two exemplary QCM flow cells of the prototype measurement device of FIG. 1.

Example: A proof of concept water analysis instrument according to FIG. 1 was realized in a R&D setting. FIG. 2 shows two exemplary QCM flow cells of the prototype measurement device. Water flow QCM flow cell supply and QCM flow cell discharge lines can be seen fluidly coupled to each of the QCM flow cells. Pumps and pump controllers are also shown in FIG. 2. The exemplary QCM flow cells used in the proof of principle implementation are available from Novaetech S.r.l. of Napoli, ITALY. The pumps used in the experimental exemplary implementation were Gikfun 12V DC Dosing Pumps with a Peristaltic Dosing Head available from Gikfun of Guangdong, China. The pump motor controllers used in the experimental exemplary implementation were SMAKN® PWM Motor Speed Control Switch Controllers available from the Shenzhen Yannuo Trade Co., Ltd. of Shenzhen, China. Valves used in the experimental exemplary implementation were valves available from Maric Flow Control of Magill South Australia. The pressure regulator used in the experimental exemplary implementation was a p-60 pressure regulator available from WATTS water of North Andover, Mass.

Figure 3:
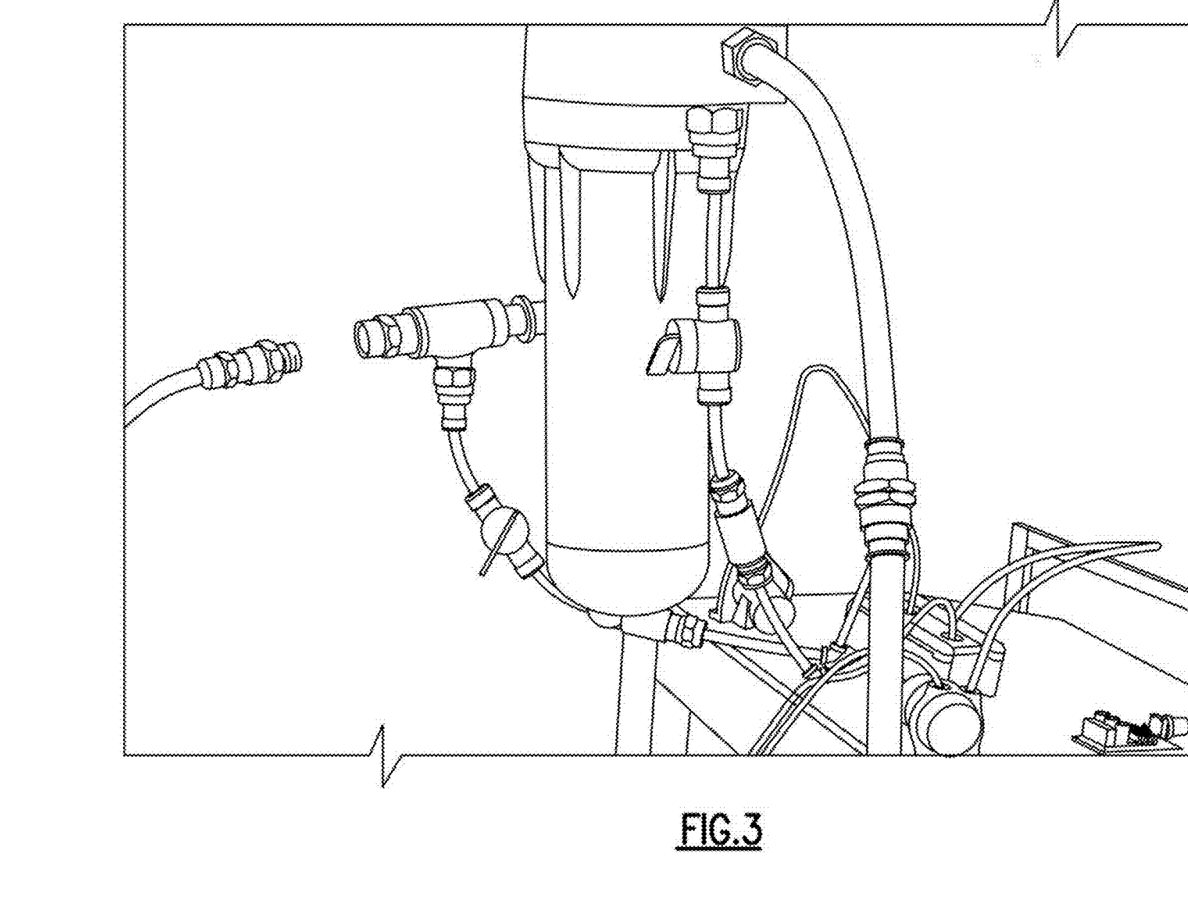
FIG. 3 shows a drawing of an exemplary scale mitigation device.

FIG. 3 shows an exemplary scale mitigation device, here a WATTS OneFlow® anti-scale canister. The first and second taps for the water sample lines can be seen in FIG. 3, one pre-treatment before the OneFlow canister, and one post-treatment in the output water line of the OneFlow canister which supplies post-treated water to an end user (e.g. in a field installation, into to the pipes of a building or home for end water use).

Figure 4:
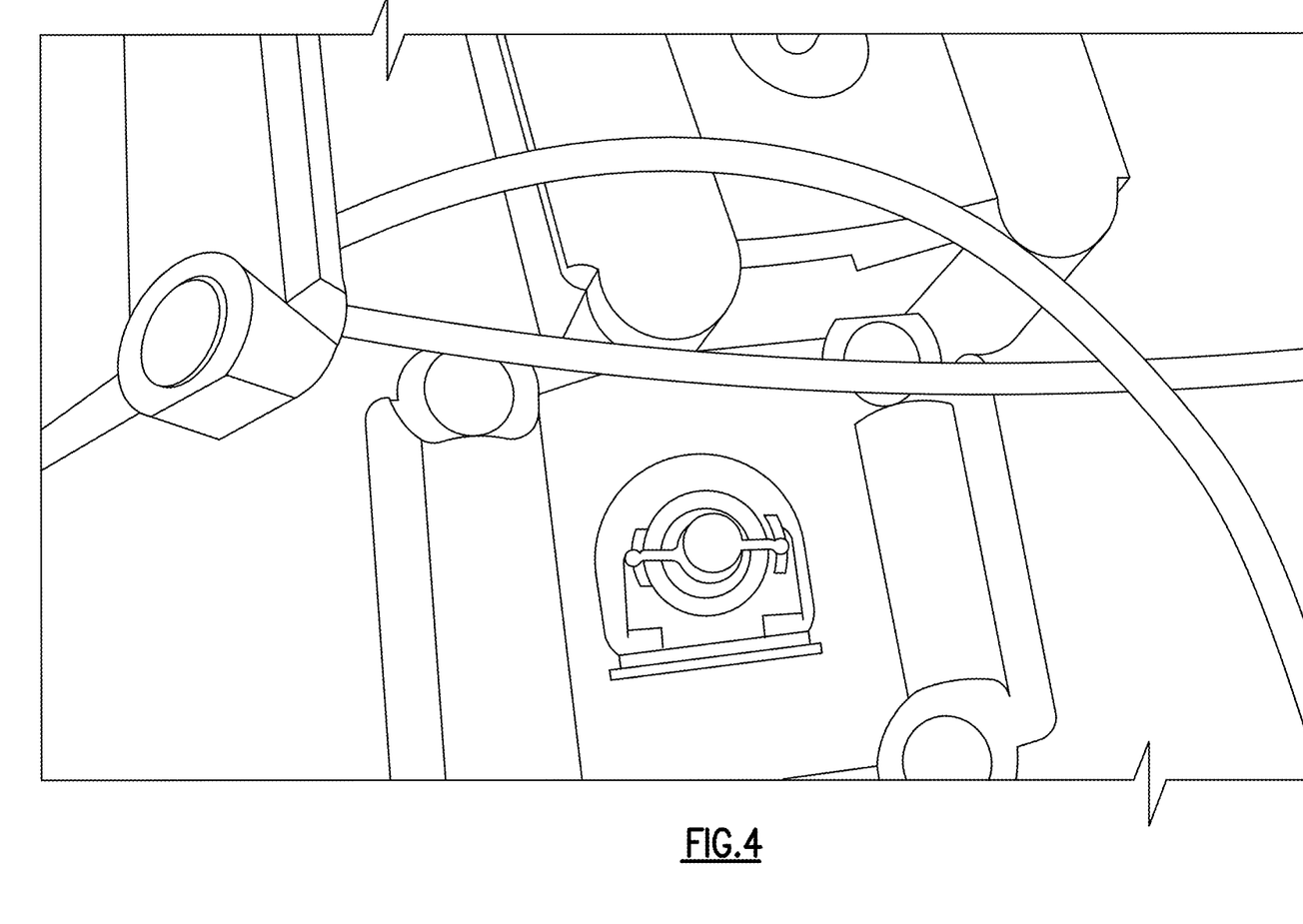
FIG. 4 shows a drawing of one of the exemplary QCM flow cells of FIG. 1 with the cover removed.
Figure 5:
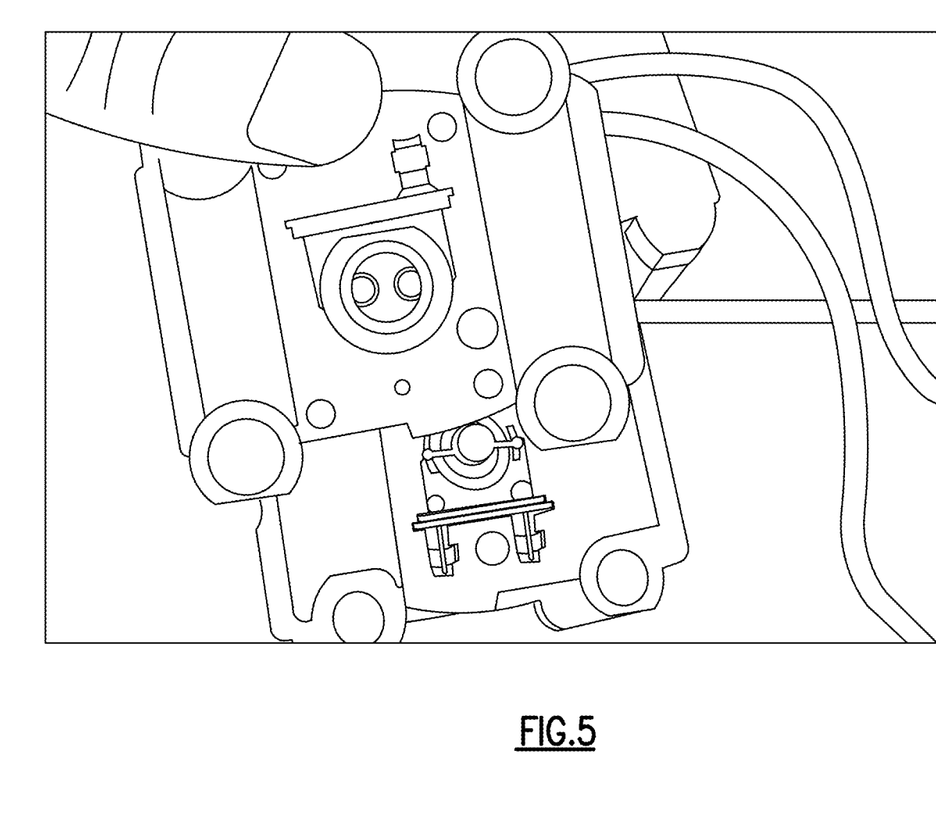
FIG. 5 shows a drawing of the inlet and outlet lines of the QCM flow cell of FIG. 4.

FIG. 4 shows the interior of one of the QCM flow cells with the cover removed. Exemplary 10 MHz crystal can be seen mounted in the QCM flow cell water flow path. In the exemplary proof of principle QCM flow cell, the cover is held attached in operation by high strength magnets at each corner of the cover. FIG. 5 shows the inlet and outlet lines of the QCM flow cell of FIG. 4 which cause a flow of sample water over the quartz crystal.

Figure 6:
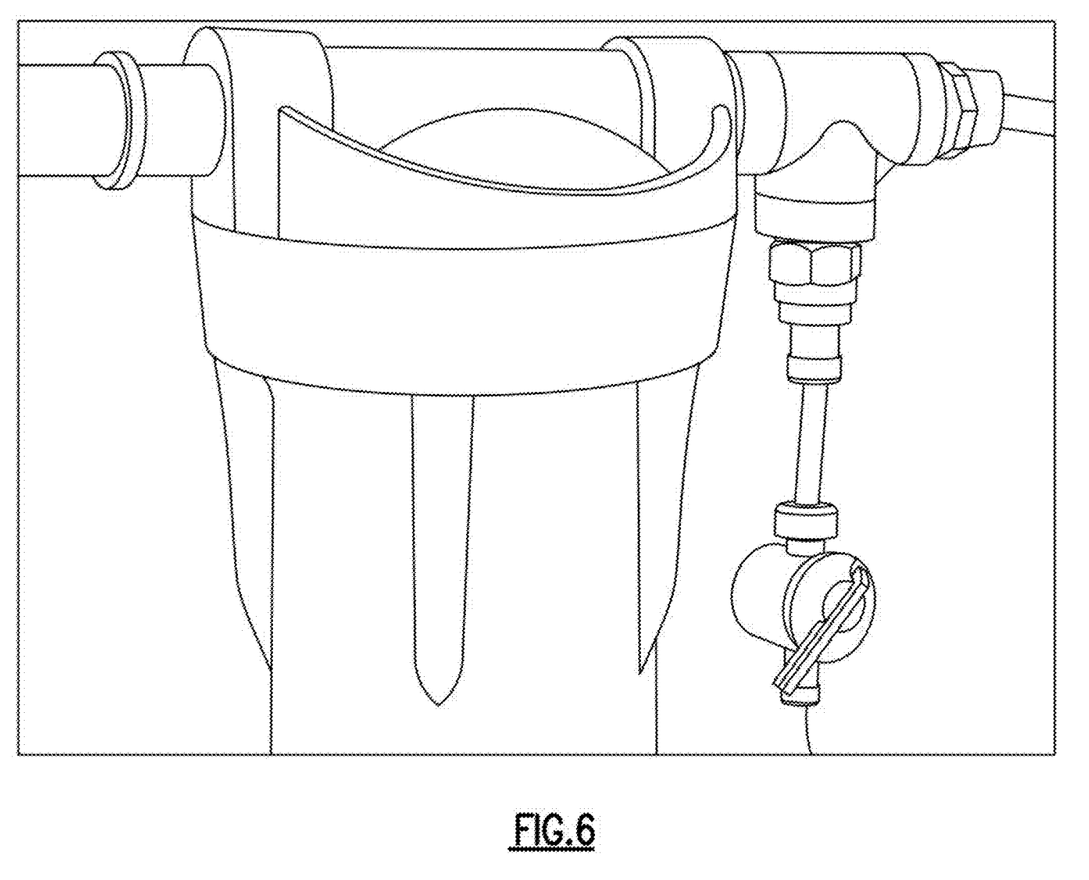
FIG. 6 shows the outlet side of an exemplary anti-scale canister.

FIG. 6 shows the outlet side of the WATTS OneFlow® anti-scale canister and the second tap in more detail.

Figure 7A:
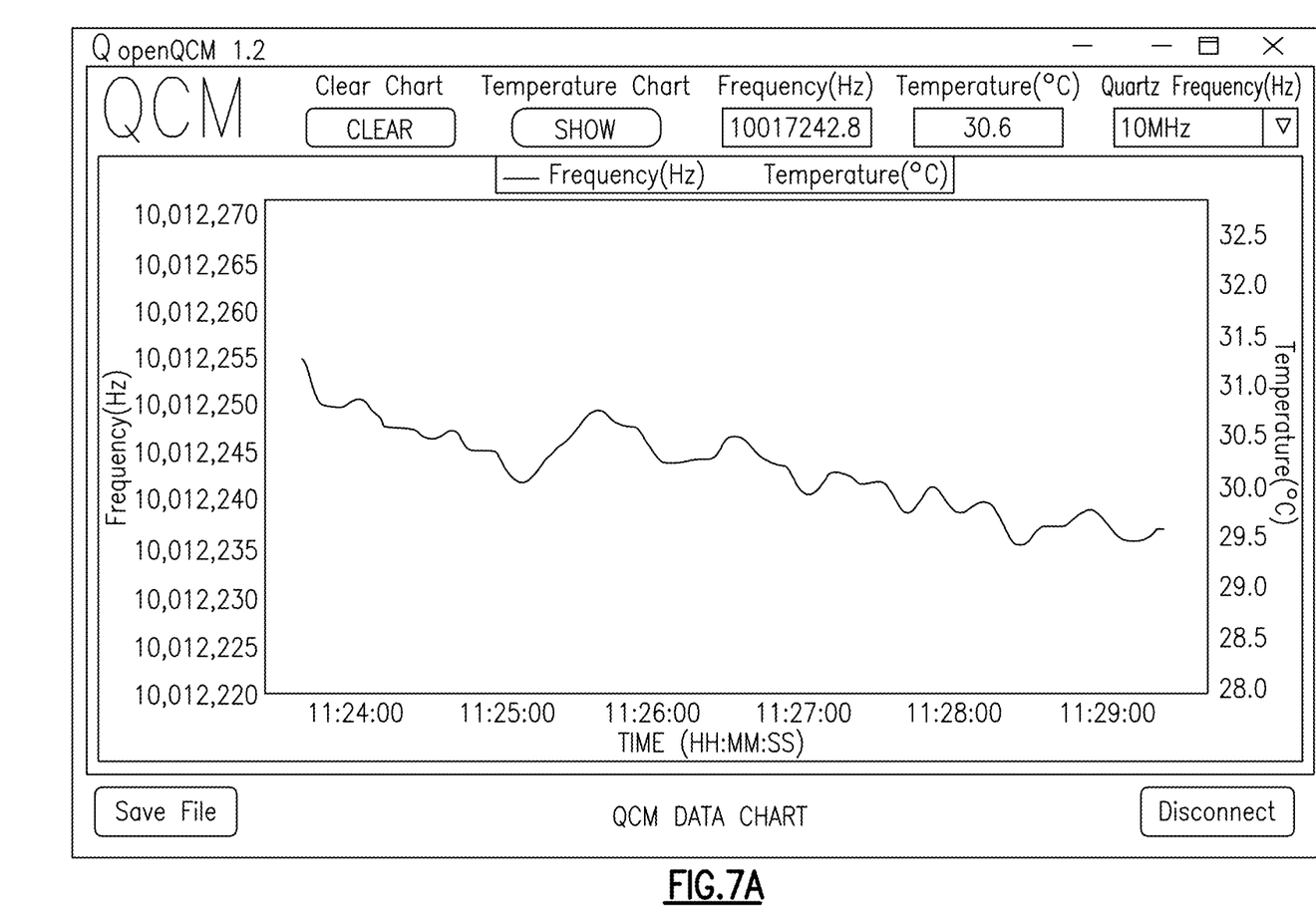
FIG. 7A, FIG. 7B show pictures of exemplary computer display screens corresponding to pre-treatment and post-treatment QCM data charts.
Figure 7B:
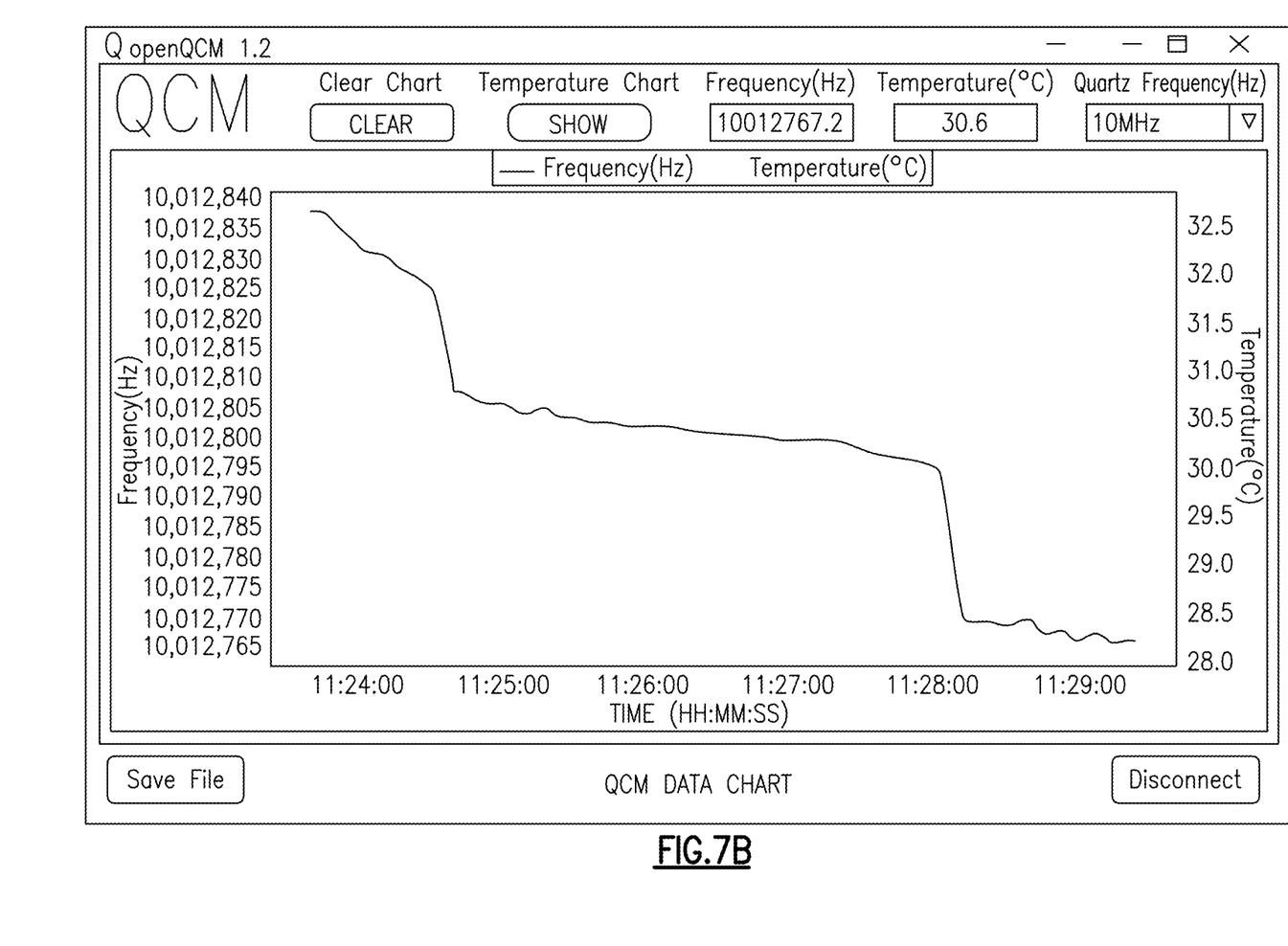

FIG. 7A, FIG. 7B show pictures of exemplary computer display screens corresponding to pre-treatment and post-treatment QCM data charts showing the first and second quartz crystal frequencies of the first and second QCMs respectively over a five-minute interval of time. In both of the graphs the frequency of each of the crystals of each of the QCM flow cells can be seen plotted versus time. An optional temperature display as indicated by the right-hand side y-axis of both graphs is not visible in FIG. 7A, FIG. 7B.

In summary, an exemplary Quartz Crystal Microbalance OneFlow water quality instrument as described hereinabove, was built to test the effectiveness of an exemplary OneFlow device over time. This experimental implementation was run at a flow rate of about 0.5 GPM on ~8 grains per gallon (GPG) hardness water and the frequency of both QCMs was periodically throughout the test period. The max delta for the untreated inlet was found to be nearly twice that of the treated outlet water. As scale begins to form on the QCM crystals, there is a steady decrease in the QCM frequency. Eventually as the exemplary OneFlow media was exhausted, the delta for the before and after becoming the same.

In some embodiments, the delta between the two QCM cell frequencies can be evaluated every 24 to 72 hours. This evaluation period can ensure that at most the OneFlow media will be exhausted for 1 to 3 days before a user is notified. A delta could also be set so that when an efficiency of the media is low enough at a predetermined efficiency, that the media could be replaced, even though it is still functioning.

As will be understood by those skilled in the art, there can be two separate frequency counters, each to measure the frequency of a single QCM cell over time, or there can be one frequency counter appropriately multiplexed to alternately and in relatively quick succession measure the frequency from two or more QCM cells. Or, there can be a frequency counter with two inputs where the frequency counter outputs a difference frequency of the two frequency sources (e.g. from the crystal in each of two QCM cells) coupled to both inputs respectively, to a computer processor.

A computer processor as used herein is understood to include any suitable hardware which includes a processor board, embedded processor, microcomputer, microcomputer board, computer (desktop, notebook, laptop, tablet, etc.), etc.

Any firmware and or software to program or operate a QCM measurement as described herein can be provided on a computer readable non-transitory storage medium. A computer readable non-transitory storage medium as non-transitory data storage includes any data stored on any suitable media in a non-fleeting manner Such data storage includes any suitable computer readable non-transitory storage medium, including, but not limited to hard drives, non-volatile RAM, SSD devices, CDs, DVDs, etc.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A water hardness mitigation or treatment evaluation system comprising:
   a first quartz crystal microbalance cell having a first quartz crystal and a fluid coupling adapted to be fluidly coupled to a pre-treated water to be flowed over said first quartz crystal;
   a second quartz crystal microbalance cell having a second quartz crystal and a fluid coupling adapted to be fluidly coupled to a post-treated water to be flowed over said second quartz crystal; and
   a computer processor communicatively coupled to one or more frequency counters to receive a first frequency data from said first quartz crystal and a second frequency data from said second quartz crystal and based on a difference of frequency over time between said first frequency data and said second frequency data caused by a first scale build-up on said first quartz crystal and a second scale build up on said second quartz crystal, said computer processor provides an indication of an effectiveness of a water hardness mitigation or treatment component or system.

2. The water hardness mitigation or treatment evaluation system of claim 1, wherein each flow cell further includes a series connected pump and a pump controller fluidly coupled to each of said first quartz crystal microbalance cell and said second quartz crystal microbalance cell respectively to set a substantially constant flow rate through said first quartz crystal microbalance cell and said second quartz crystal microbalance cell.

3. The water hardness mitigation or treatment evaluation system of claim 1, wherein each of said first quartz crystal and said second quartz crystal comprise a natural frequency of about 10 MHz.

4. The water hardness mitigation or treatment evaluation system of claim 1, wherein said indication of an effectiveness of a water hardness mitigation or treatment component or system comprises a display graph of said first frequency data and said second frequency data, or a difference thereof.

5. The water hardness mitigation or treatment evaluation system of claim 1, further comprising one or more valves, said computer processor communicatively coupled to said one or more valves, and said indication of an effectiveness of a water hardness mitigation or treatment component or system comprises an actuation of said one or more valves to automatically select which water hardness mitigation or treatment component of said water hardness mitigation or treatment evaluation system is to receive a water to be treated.

6. A method to evaluate and effectiveness of a water hardness mitigation or treatment evaluation system comprising:
    providing a first quartz crystal microbalance cell having a first quartz crystal over which a pretreated water is flowed, a second quartz crystal microbalance cell having a second quartz crystal over which a post-treated water is flowed, and a computer processor communicatively coupled to one or more frequency counters to receive a first frequency data from said first quartz crystal and a second frequency data from said second quartz crystal;
    calculating a frequency difference between said first quartz crystal and said second quartz crystal;
    recording said frequency difference over a period of time; and
    providing an indication of an effectiveness of a water hardness mitigation or treatment component or system.

7. The method to evaluate and effectiveness of a water hardness mitigation or treatment evaluation system of claim 6, wherein said step of providing further comprises providing a pump fluidly coupled to and in series with each of said first quartz crystal microbalance cell and said second quartz crystal microbalance cell respectively to provide a substantially constant flow of liquid through said first quartz crystal microbalance cell and said second quartz crystal microbalance cell.

8. The method to evaluate and effectiveness of a water hardness mitigation or treatment evaluation system of claim 6, wherein said step of providing an indication comprises displaying one or more graphs of frequency of either of said first quartz crystal and said second quartz crystal or a difference thereof.

9. The method to evaluate and effectiveness of a water hardness mitigation or treatment evaluation system of claim 6, wherein said step of providing an indication comprises providing an indication to an operator indicating that one or more components of said water hardness mitigation or treatment component or system need to be serviced or changed.

10. The method to evaluate and effectiveness of a water hardness mitigation or treatment evaluation system of claim 6, wherein said step of providing an indication comprises controlling one or more valves to automatically select by computer which of one or more treatment or mitigation components is to receive a flow of water to be treated.

* * * * *